United States Patent [19]

Leatherman

[11] Patent Number: 4,541,891
[45] Date of Patent: Sep. 17, 1985

[54] METHOD AND APPARATUS FOR HEAT SEALING PLASTIC MEMBERS

[75] Inventor: Alfred F. Leatherman, Columbus, Ohio

[73] Assignee: William C. Heller, Jr., Milwaukee, Wis.

[21] Appl. No.: 429,017

[22] Filed: Sep. 30, 1982

[51] Int. Cl.⁴ .................. B32B 31/00; B30B 5/02; B30B 15/34; B23K 13/02
[52] U.S. Cl. .................. 156/379.6; 156/382; 156/583.3; 156/272.4; 156/273.7; 156/275.1; 156/285; 156/293; 156/294; 264/315; 425/508; 219/10.43; 219/10.53; 219/10.75
[58] Field of Search .................. 156/382, 304.2, 304.6, 156/379.6, 381, 272.2, 272.4, 273.5, 273.7, 275.1, 285, 583.1, 583.3, 293, 294; 264/314, 315, 313; 425/440, 441, 508, 389, DIG. 19; 100/211; 219/10.43, 10.53, 10.75

[56] References Cited

U.S. PATENT DOCUMENTS

| | | | |
|---|---|---|---|
| 3,458,611 | 7/1969 | Roberts | 264/314 |
| 3,753,499 | 8/1973 | Gwilliam | 100/211 |
| 3,805,961 | 4/1974 | Clark et al. | 100/211 |
| 3,837,965 | 9/1974 | Mahon et al. | 100/211 |
| 3,865,662 | 2/1975 | Segal | 156/304.6 |
| 3,888,618 | 6/1975 | Jones | 425/389 |
| 4,095,480 | 6/1978 | Schwabauer | 264/313 |
| 4,132,578 | 1/1979 | Gell, Jr. | 156/304.6 |

Primary Examiner—Edward Kimlin
Assistant Examiner—Merrell C. Cashion
Attorney, Agent, or Firm—Andrus, Sceales, Starke & Sawall

[57] ABSTRACT

A heat sealing apparatus for bonding plastic tubular members includes a seamless, tubular, elastic heating element encircling the plastic members. In one form, an annular inflatable bladder filled with hydraulic fluid encircles the heating element, and includes a rigid outer wall and an elastic inner wall that is bonded to the outer surface of the heating element. When the bladder is pressurized the heating element is compressed inwardly to a bonding position against the plastic members. The plastic members are then heated to a bonding temperature by the heating element resulting in a fusion bond along their interface. When the bladder is evacuated the heating element opens outwardly to be spaced from the plastic members to allow removal of the sealed members. The heating element includes a uniform dispersion of susceptor particles that will generate heat when exposed to the high frequency magnetic field of an induction heating coil. A method of heat sealing tubular plastic members is also disclosed.

5 Claims, 6 Drawing Figures

METHOD AND APPARATUS FOR HEAT SEALING PLASTIC MEMBERS

BACKGROUND OF THE INVENTION

This invention relates to a method and apparatus for bonding plastic materials, and more particularly relates to heat sealing the interface of two plastic tubular members to form a self-supporting assembly.

It is necessary to permanently connect two plastic members for a variety of applications. The connection is generally accomplished by heating the interface of the plastic members to a bonding temperature and applying an appropriate pressure with the heat at the bonding temperature. However, to effectively and firmly seal two plastic members it is necessary to provide a bond that is smooth and wrinkle-free. This is difficult to accomplish primarily because of problems in controlling the proper bonding temperature, pressure and heat location for sealing. These problems are accentuated when plastic materials having various thicknesses and different bonding characteristics are being sealed.

In this regard, it is known to use various sources of heating energy such as induction, dielectric, radiant and conductive sources. For example, Taylor et al, U.S. Pat. No. 4,119,825 shows an induction heating apparatus for a dieless drawing operation to form metals. The apparatus includes a flexible induction coil made from a flexible metallic strip contained within an elastomeric sleeve that surrounds the workpiece being heated and substantially conforms to the surface of the workpiece. The coil however is not seamless and thus may cause a discontinuous seal if used with plastic members. Also, the coil does not collapse about the workpiece or supply any bonding pressure as would be necessary with plastic members.

Various methods have been utilized to heat seal two plastic members. One such method is particularly adapted for sealing tubular members, and employs a discontinuous metal band or bands positioned about and in contact with the tubular members to be sealed. The metal band or bands are then heated, and a seal is formed along the interface between the two plastic members. However, this method may cause bunching of the plastic being sealed as well as undesirable voids or wrinkles in the bond causing a less effective seal.

A particularly useful method of generating heat for joining two plastic members uses discrete susceptor particles within the surfaces to be joined and applying a high frequency magnetic field. See for example, Heller, Jr. et al, U.S. Pat. No. 4,035,547; Heller, Jr. et al, U.S. Pat. No. 3,574,031; and Leatherman et al, U.S. Pat. No. 3,528,867. In this prior art, the susceptor particles may be located either directly upon or within the surfaces to be joined or supported within an intermediate base interposed between the surfaces to be joined. When subjected to the high frequency magnetic field of an induction heating coil, the susceptor particles generate heat resulting in a fusion bond along the interface of the plastic members. In this and similar methods a pressure is applied across the members during the bond to create a firm and continuous interface bonding.

SUMMARY OF THE INVENTION

The present invention relates to a heat sealing method and apparatus for providing a smooth and wrinkle-free bond between two plastic members. More specifically, the apparatus of the present invention includes an elastic heating element encircling the plastic members at an interface to be sealed, means for raising the temperature of the heating element to heat the surfaces along the interface to a bonding temperature, and positioning means coupled to the heating element for moving the heating element between bonding and non-bonding positions. In its bonding position, the heating element engages and conforms to the external configuration of the plastic members and establishes a bonding pressure thereon. In this position, the heating element heats the plastic members to create a fusion bond along their interface. In its non-bonding position, the heating element is elastically expanded outwardly by the positioning means to be spaced from the plastic members to permit their removal subsequent to bonding.

The heat sealing method and apparatus of the present invention is particularly adapted for joining tubular plastic members in a continuous-type operation. For such purposes, the preferred embodiment of the invention utilizies a seamless, tubular, elastic heating element positioned about the tubular plastic members. The elastic and tubular characteristics of the heating element provide for ease in loading of the plastic members to be sealed and unloading of the assembled members subsequent to sealing. The elastic characteristics of the heating element is also advantageous in that when collapsed about the plastic members to be sealed, the required bonding pressure necessary for a high strength fusion bond may be provided by proper construction and arrangement of the elastic heating element. The seamless nature of the heating element and its tubular shape also provide accurate control of the bonding heat so that a seal is provided along the interface of the plastic members without bunching of the plastic, and without undesirable voids or wrinkles in the fusion bond.

In one form, the invention includes a seamless, tubular, elastic heating element which is mounted to encircle a pair of tubular plastic members and particularly aligned with the surfaces to be sealed. The inner diameter of the heating element in its relaxed condition is preferably slightly less than the outer diameter of the plastic members. The heating element preferably includes a uniform dispersion of susceptor particles such as a ferromagnetic oxide such as disclosed in the previously identified Heller patents, that will generate heat when exposed to the high frequency magnetic field of an induction heating coil. For example, the outer surface of the heating element, for example, is adhesively or otherwise suitably bonded to a hollow, cylindrical, elastic inner wall of an inflatable bladder. The bladder, for example, is in the shape of a hollow annular torus surrounding the heating member that defines a pressure chamber, which is filled with a pressurized fluid such as mineral oil. The outer wall of the bladder, for example, is substantially rigid so that when the chamber is pressurized the elastic heating element is forced radially inward to a bonding position engaging the plastic members. When the chamber is evacuated the heating element expands and opens radially outward to be spaced from the plastic members. A helical induction coil is positioned within the chamber about the heating element. When the heating element is in its bonding position, the induction coil is energized for a sufficient duration to allow the susceptor particles to generate a bonding temperature along the interface between the plastic members and create a heat seal. The chamber may then be evacuated subsequent to bonding to open the heating element and permit removal of the assembled plastic members.

In another form of the invention, the bladder arrangement described above is replaced by a hollow, cylindrical, elastic sleeve that has the elastic heating element bonded to its inner surface, and a mechanical means for moving the heating element between its bonding and non-bonding positions. The mechanical means may include rods attached circumferentially about the sleeve and connected to levers or cams which are actuated to alternately open and relax the heating element into its respective non-bonding and bonding positions.

In yet another form of the invention the bladder arrangement and elastic sleeve described above may be replaced by an annular, elastic washer. The elastic washer has the heating element formed within or separately formed and bonded to its inner surface, and includes an inner diameter that is less in its relaxed state than the outer diameter of the tubular plastic members to be sealed. This again provides sufficient bonding pressure applied to the surfaces being sealed. A mechanical arrangement for opening and closing the heating element is preferably employed with this form of the invention.

All forms of the present invention preferably employ an induction heating coil as the means for raising the temperature of the heating element to a bonding temperature. However, the heating element may also be fabricated to respond to dielectric, radiant or conductive sources of energy.

The present invention is also particularly adapted for use in a continuous-type heat sealing operation. During such operations, there is considerable heat developed within the apparatus. It is necessary to remove some of this heat to protect the components of the pressure applying apparatus, and to allow the seal along the interface of the plastic members to cool somewhat prior to unloading. To remove this heat, the present invention incorporates cooling means such as cooling coils or air blasts.

BRIEF DESCRIPTION OF THE DRAWINGS

The drawings illustrate the best modes presently contemplated of carrying out the invention.

In the drawings.

DESCRIPTION OF THE PREFERRED EMBODIMENTS

Figure 1:
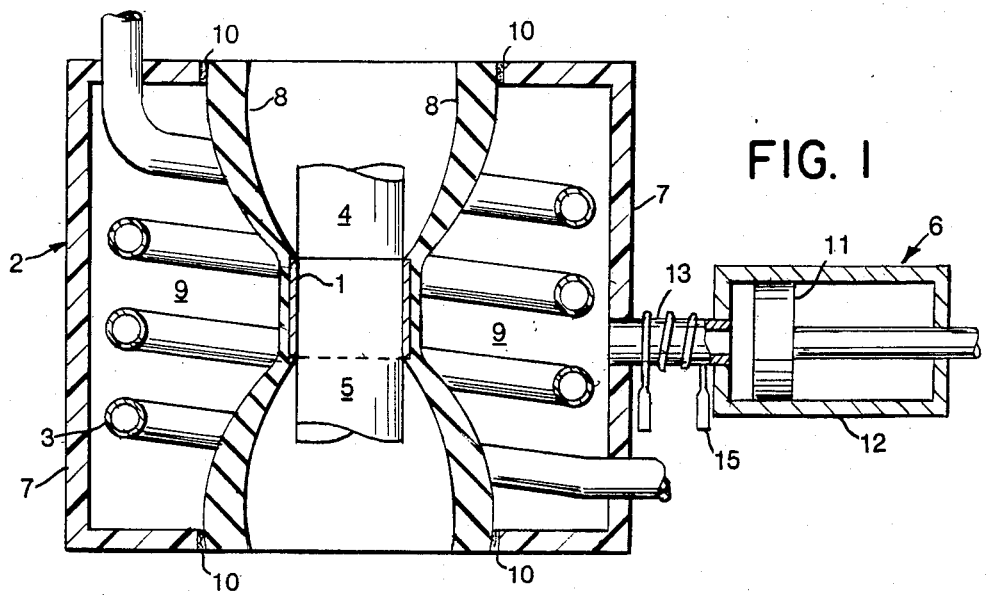
FIG. 1 is a view in section of a heat sealing apparatus illustrating one embodiment of the present invention with the elastic heating element in its contracted or bonding position.
Figure 2:
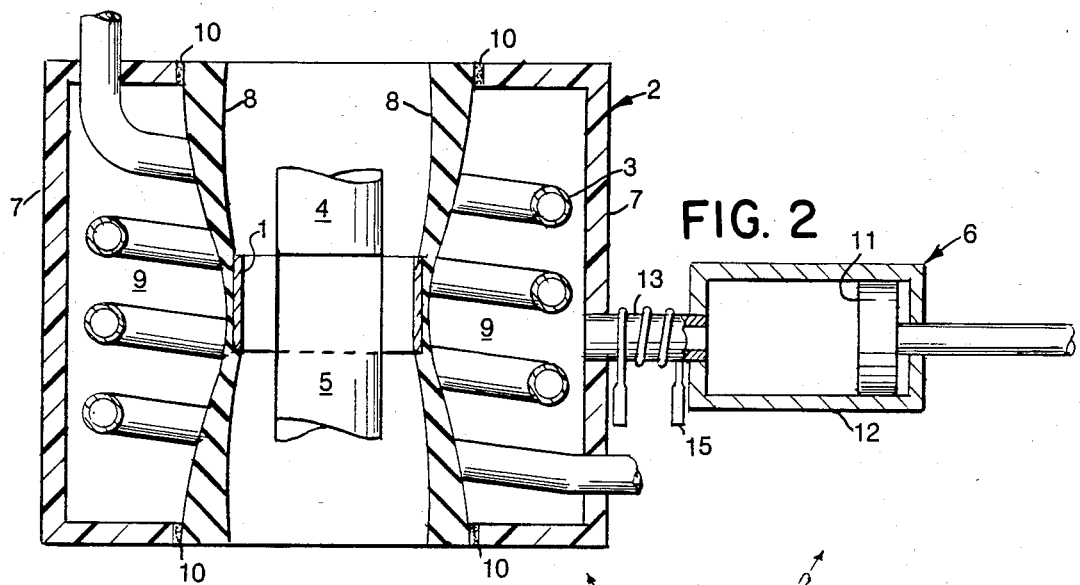
FIG. 2 is a view in section of the sealing apparatus of FIG. 1 illustrating the elastic heating element in its non-bonding expanded position.

Referring to the drawings, FIGS. 1 and 2 show a heat sealing apparatus for bonding plastic tubular members constituting a preferred embodiment of the present invention. As shown, the heat sealing apparatus includes an elastic heating element 1, an inflatable annular bladder 2 encircling the heating element 1, and an induction heating coil 3 positioned within the bladder 2 and surrounding the heating element 1. The heat sealing apparatus illustrated is particularly adapted to connect a pair of overlapped plastic tubular members 4 and 5 mounted to form a self-supporting assembly. For example, the inner tubular member 5 may consist of a solid cylinder of heat sealable material or a sleeve like member with an inner support, and tubular member 4 may consist of a thin sleeve of heat sealable plastic having an inner diameter substantially corresponding to the outer diameter of the cylinder so that when assembled the members 4 and 5 form a jacket. The outer member 4 is also of such a construction that a compressive force applied to the external surface results in a pressurized engagement with the inner member 5. The interface between the members 4 and 5 provides the surfaces to be sealed, and at least these surfaces must be comprised of a heat softenable thermoplastic material so that the apparatus of the present invention may create a fusion bond between members 4 and 5. It is readily apparent that tubular members 4 and 5 need not necessarily be cylindrical in configuration. Thus, the term "tubular" is intended to include not only cylindrically shaped members but also members having cross-sections of other geometric shapes, such as triangles, rectangles and polygons.

The elastic heating element 1 is in the form of a seamless, tubular cylinder that defines a central opening for receiving the tubular members 4 and 5 to be sealed. The central opening of the heating element 1 also defines a heat sealing zone as will hereinafter be more fully described. As with the plastic members 4 and 5, heating element 1 need not necessarily be cylindrically shaped as shown in FIGS. 1 and 2. In this regard, the term "tubular" when applied to the heating element 1 is also intended to include heating elements having cross-sections of geometric shapes in addition to cylinders, such as triangles, rectangles and polygons. The walls of heating element 1 may vary in thickness from about 25 to about 40 mils, and preferably element 1 extends longitudinally a distance greater than its thickness or diameter. However, an annular ring-like member is also contemplated as being within the scope of the invention, and thus the longitudinal extent of heating element 1 generally depends upon the length of the interface between the tubular members 4 and 5 and the desired axial length of the fusion bond along their interface.

The elastic characteristic of heating element 1 permits its expansion and contraction about the plastic members 4 and 5 as desired. When contracted, heating element 1 is in a bonding position about plastic members 4 and 5, and when expanded heating element 1 is in a non-bonding position about members 4 and 5. In its bonding position, the inner surface of heating element 1 engages and conforms to the external configuration of the plastic tubular members 4 and 5. Heating element 1 preferably remains elastically expanded to some degree when in its bonding position in order to establish a bonding pressure on members 4 and 5. For example, if heating element 1 and tubular members 4 and 5 are cylindrical in shape, the inner diameter of heating element 1 in its relaxed condition is preferably less than the outer diameter of members 4 and 5. Thus, when heating element 1 is collapsed about plastic members 4 and 5 in its bonding position, heating element 1 will inherently supply a bonding pressure on the interface to be sealed. However, heating element 1 may also be fabricated so that its inner diameter in its relaxed condition substantially equals the outer diameter of tubular members 4 and 5. In such a case bonding pressure may be supplied by the inflatable bladder 2, as will hereinafter be described, or if the work members are of suitable material an internal pressure may be applied to expand the work members and thereby create a bonding pressure over the smooth interface.

Heating element 1 also includes a non-bonding position wherein it is elastically expanded outwardly of its bonding position. In this position the inner surface of heating element 1 is spaced from the outer surfaces of tubular members 4 and 5 to permit relative movement of plastic members 4 and 5 with respect to heating element 1. Thus, members 4 and 5 may readily be loaded or inserted and unloaded or removed from the sealing zone defined within heating element.

Heating element 1 preferably includes a uniform dispersion of particulate susceptor material capable of generating heat in response to an indirect source of energy. Heating element 1 may be fabricated by uniformly dispersing this particulate material into an uncured silicone rubber base. Preferably, the particulate material will generate heat when excited by the high frequency magnetic field of an induction heating source. A typical susceptor particle is a metal oxide having magnetic loss properties, such as gamma iron oxide ($Fe_2O_3$) or magnetic oxide ($Fe_3O_4$) or like particles, such as those disclosed in U.S. Pat. No. 3,709,775. The susceptor particles preferably comprise between about 10 to about 50 weight percent of the elastic heating element 1. In addition to those susceptor particles discussed above, other particles may be used such as particles of iron, iron alloys or even non-magnetic metals and carbons. The uncured silicone rubber base may be cast by conventional means and cured to form the seamless tubular heating element 1. For example, heating element 1 could be fabricated on a Teflon rod, or cast in a form or mold to provide a smooth surface and a uniform wall thickness. A silicone rubber is selected that has adequate elastic properties and is not seriously affected by the heat generated from the susceptor particles. The susceptor particles are selected according to their known heat generating ability depending upon the bonding temperatures desired. Thus, with susceptor particles of the characteristics desired dispersed within the desired silicone rubber, an induction heating source may be energized to interact therewith to rapidly generate heat. This heat can readily be controlled within the heating zone inside heating element 1 and directed toward the interface of the plastic members 4 and 5.

A positioning means coupled to heating element 1 for moving element 1 between its respective bonding and non-bonding positions includes the inflatable bladder 2 and a hydraulic cylinder 6. The bladder 2 is hollow, and shaped like a doughnut or torus. The bladder 1 includes an outer wall 7 and an inner wall 8 which together define an annular pressure chamber 9 encircling heating element 1. Outer wall 7 is preferably fabricated from an acrylic material which is substantially rigid and non-deformable. Inner wall 8, however, is preferably comprised of a non-heat generating material such as silicone rubber having elastic characteristics so that when pressure chamber 9 is pressurized inner wall 8 will be deformed inwardly toward plastic members 4 and 5. As seen in FIGS. 1 and 2, inner wall 8 is preferably comprised of a hollow, cylindrical boot in the shape of an hourglass adhesively cemented, as at 10, into the center of bladder 2. The outer surface of heating element 1 is adhesively cemented onto the inner surface of the waist of the hourglass-shaped inner wall 8, as shown in FIGS. 1 and 2. It should also be noted that inner wall 8 is thickest at its upper and lower ends and thinnest at its waist so that maximum deflection tends to take place at the waist when pressure chamber 9 is pressurized. This also aids in cooling the seal after being formed by readily allowing heat to transfer to the interior of bladder 2.

Figure 3:
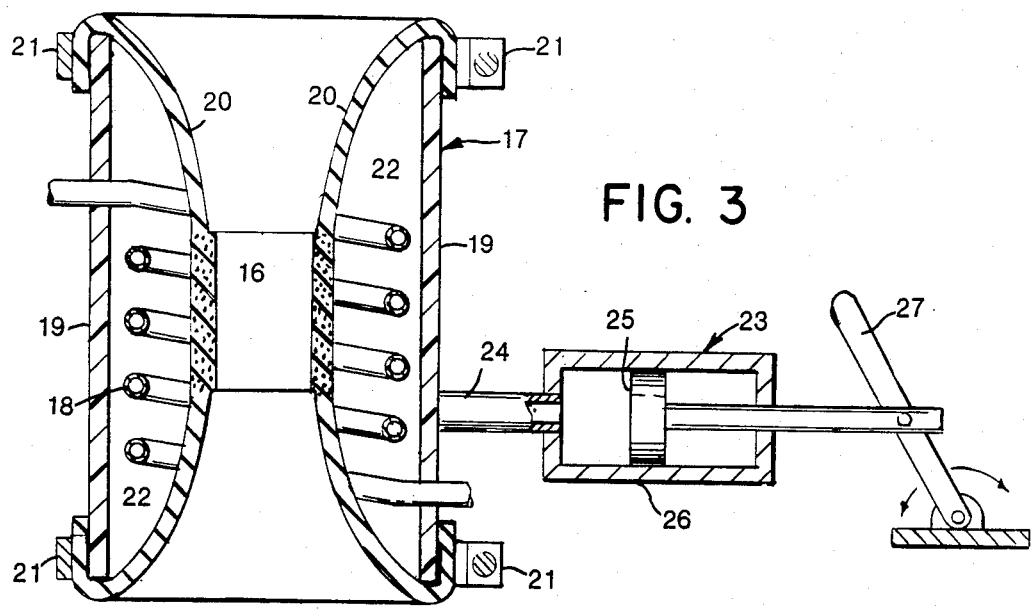
FIG. 3 is a view in section of a heat sealing apparatus illustrating a second embodiment of the present invention.

Hydraulic cylinder 6 includes a piston 11 slidably disposed within a cylinder 12 that forms a fluid-tight seal therewith. Hydraulic cylinder 6 communicates with pressure chamber 9 though outer wall 7 by means of a connecting pipe 13, and piston 11 may be actuated in any conventional manner as for example by a pump (not shown), or a hand operated lever 27 (FIG. 3). Pressure chamber 9, cylinder 12, and connecting pipe 13 are preferably filled with a fluid, such as mineral oil or water, so that the actuation of piston 11 will serve to either pressurize chamber 9 causing heating element 1 to collapse and compress radially inwardly to its bonding position, or to evacuate chamber 9 causing heating element 1 to open or elastically expand radially outwardly to its non-bonding position.

The heat sealing apparatus shown in FIGS. 1 and 2 also includes an induction heating coil 3 as a means for raising the temperature of heating element 1 to heat the interface of the plastic members 4 and 5 to a bonding temperature. Heating coil 3 is positioned within bladder 2 in pressure chamber 9 and encircles heating element 1. Heating coil 3 preferably extends the entire length of bladder 2 and consists of one continuous length of tubing with the inner diameter of the coils closely spaced with respect to heating element 1. This insures that the susceptor particles of heating element 1 are adequately energized by the magnetic field created by induction coil 3. Induction coil 3 preferably consists of hollow copper tubing and is connected to a suitable induction heating generator (not shown) which supplies electric current and circulating cooling water through the coil in a conventional manner.

When the induction heating generator is actuated, coil 3 will produce a high frequency magnetic field which will excite the susceptor particles of heating element 1. Heating element 1 will rapidly generate heat of a sufficient bonding temperature and duration to create a fusion bond along the interface of plastic members 4 and 5. The duration of heat generation may be terminated by simple deactuating the induction heating generator. For example, if the heating generator is activated for a duration of two seconds bonding temperatures of about 400° F. may be generated by heating element 1 which is sufficient to seal many thermoplastic materials.

Heat that would tend to build up in the oil contained within chamber 9 and cylinder 12 may be removed by the water cooling action of the induction heating coil or can be removed by some other cooling means such as the cooling coils 15 schematically illustrated in FIGS. 1 and 2. Cooling coils 15 are preferably wrapped about connecting pipe 13 to remove heat from the oil as it passes between pressure chamber 9 and cylinder 12.

To make a seal, the piston 11 is actuated to the right as shown in FIG. 1 to evacuate or exhaust some of the oil from pressure chamber 9 into cylinder 12. The inner wall or boot 8 is thus forced outwardly which causes boot 8 to take a cylindrical-like shape. Plastic members 4 and 5 are then loaded by inserting them within heating element 1 so that the interface to be sealed is inside heating element 1 and in alignment with the heating zone defined therein. When plastic members 4 and 5 are properly positioned, piston 11 may be advanced to the left as seen in FIG. 1 to pressurize chamber 9 and force the waist of the boot or inner wall 8 as well as heating element 1 radially inward into a bonding position whereby the inner surface of heating element 1 engages and conforms to the external configuration of plastic tubular members 4 and 5. As previously noted, when heating element 1 is in its bonding position it remains elastically expanded to some degree so that it establishes a bonding pressure about tubular members 4 and 5. However, if this inherent pressure is insufficient piston 11 may be advanced slightly further to increase the pressure within chamber 9 and supply any additional bonding pressure required. The coil 3 is then energized by the induction heating generator to excite the susceptor material within heating element 1 and create heat which is directed toward tubular members 4 and 5. Element 1 then heats the plastic members 4 and 5 to a sufficient bonding temperature and for a sufficient duration to make a fusion bond along their interface. Although a fusion bond is formed along the entire circumference of the interface of plastic members 4 and 5, it should be noted that this seal need not extend the entire axial or circumferential length of the interface. The temperature and duration of heat generation is determined by the type of thermoplastic material being bonded and may typically be a temperature of about 400° F. for about two seconds. As previously noted, the thickness of the walls of heating element 1 and the waist of boot 8 are sufficiently thin that the generated heat can be transferred swiftly into the cool oil contained within chamber 9. Thus, the seal between plastic members 4 and 5 is cooled prior to opening heating element 1. Piston 11 is then actuated to the right as shown in FIG. 2 which once again exhausts oil from chamber 9 into cylinder 12 causing heating element 1 to expand and open radially outwardly. The sealed plastic members 4 and 5 are now a self-supporting assembly and may be unloaded or removed. The sealing apparatus is then once again ready for loading. As is readily apparent, the sealing apparatus described is readily adaptable to both a continuous-type as well as a batch-type operation Turning now to FIG. 3 there is shown a second embodiment of the present invention. The heat sealing apparatus shown in FIG. 3 is similar to that shown in FIGS. 1 and 2 and includes a heating element 16, an inflatable bladder 17 and an induction heating coil 18. Heating element 16 defines a central heat sealing zone in a manner substantially identical to heating element 1 of the first embodiment. However, heating element 16 is formed integrally with inner wall 20 of bladder 17, and is fabricated by uniformly dispersing therein a particulate material which will generate heat when excited by the high frequency magnetic field of induction heating coil 18.

The inflatable bladder 17 is shaped like a doughnut or torus and encircles heating element 16. Bladder 17 includes a substantially rigid, preferably nonmetal, hollow cylinder which forms its outer wall 19, and a second, elastic, hollow cylinder which forms its inner wall 20. Bladder 17 is fabricated from a non-heat generating elastic material such as silicone rubber. The upper and lower ends of inner wall 20 are curled over the upper and lower edges of outer wall 19, and a pair of band clamps 21 press the ends of inner wall 20 tightly against outer wall 19. Thus, inner wall 20 and outer wall 19 form a closed, annular pressure chamber 22 which encircles heating element 16. Heating element 16 is integrally formed into wall 20 at the center of bladder 17 so that pressurization of chamber 22 will cause heating element 16 to move radially inwardly to a bonding position and evacuation of chamber 22 will cause heating element 16 to expand radially outwardly to a non-bonding position.

A hydraulic cylinder 23 communicates with chamber 22 through outer wall 19 by means of a connecting pipe 24. The cylinder 23 together with bladder 17 provide a positioning means for moving element 16 between its respective bonding and non-bonding positions. Hydraulic cylinder 23 includes a piston 25 connected to a manually actuatable lever 27 which slidably moves piston 25 within a cylinder 26. Chamber 22, cylinder 26 and connecting pipe 24 are filled with a fluid such as mineral oil, or water so that when lever 27 is moved to the left, as seen in FIG. 3, piston 25 is advanced and chamber 22 is pressurized to move heating element 16 radially inwardly to a bonding position. When lever 27 is moved to the right, piston 25 also moves to the right and evacuates or withdraws some of the oil from within chamber 22 into cylinder 26 causing heating element 16 to be expanded radially outwardly to a non-bonding position.

The induction heating coil 18 provides the means for raising the temperature of heating element 16 to heat the interface of plastic members 4 and 5 to a bonding temperature. The coil 18 is located within chamber 22 and is connected to a suitable induction heating generator (not shown) which supplies electric current to the coil in the conventional manner. Heating coil 18 closely encircles heating element 16, and preferably consists of a continuous length of hollow copper tubing carrying cooling water to aid in the removal of heat generated during bonding. Additional cooling coils may, however, also be positioned about connecting pipe 24 or in any other suitable manner as desired.

The operation of the heat sealing apparatus shown in FIG. 3 is identical to that previously described for the first embodiment of FIGS. 1 and 2 and therefore need not be further described.

Figure 5:
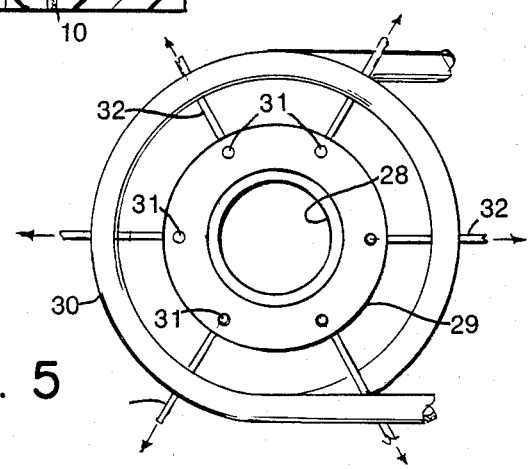
FIG. 5 is a top view of the heat sealing apparatus of FIG. 4 illustrating the elastic heating element in its expanded non-bonding position.
Figure 4:
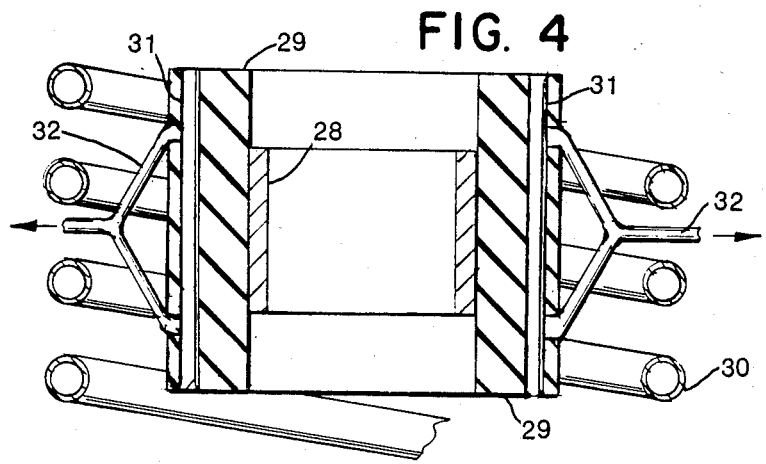
FIG. 4 is a view in section of a heat sealing apparatus illustrating a third embodiment of the invention.

FIGS. 4 and 5 show a heat sealing apparatus constituting a third embodiment of the present invention. The heat sealing apparatus shown in FIGS. 4 and 5 includes a heating element 28, an elastic sleeve 29, and an induction heating coil 30. Heating element 28 is in the form of a seamless, tubular cylinder defining a central heat sealing zone in a manner substantially identical to heating elements 1 and 16 of the first and second embodiments described herein. In particular, heating element 28 has elastic characteristics identical to those of elements 1 and 16 for movement between bonding and non-bonding positions, and is fabricated for example by uniformly dispersing into silicone rubber a particulate material which will generate heat when excited by the high frequency magnetic field of induction heating coil 30.

The sleeve 29 is also in the form of a seamless, tubular cylinder, and is comprised of a non-heat generating material, such as silicone rubber, having elastic characteristics which are substantially identical to those for heating element 28. Sleeve 29 includes several rigid, nonmetal rods 31 fabricated therein parallel to its longitudinal axis. There are preferably six rods 31 circumferentially disposed and equispaced from one another. Each rod 31 has a cord 32 attached to its opposite ends which extends radially outward therefrom. These cords 32 are connected to any type of conventional mechanism that will supply a radial pulling force thereon. For example, a lever or a cam mechanism might be utilized that when actuated will cause the cords 32 and rods 31 to elastically expand or contract sleeve 29 between open and closed positions. Since heating element 28 is adhesively bonded onto the inner surface of sleeve 29, element 28 is also moved between its bonding and non-bonding positions.

The heat sealing apparatus shown in FIG. 4 also includes the induction heating coil 30 as a means for raising the temperature of heating element 28 to heat the interface between plastic members 4 and 5 to a bonding temperature. Coil 30 encircles both element 28 and sleeve 29, and preferably extends the entire length of sleeve 29 to insure adequate energization of the susceptor particles within element 28. Coil 30 preferably consists of a continuous length of copper tubing, and is connected to a conventional induction heating generator in the usual manner.

The operation of the heat sealing apparatus of FIGS. 4 and 5 is identical to that previously described for the embodiments of FIGS. 1–3 with the exception that sleeve 29 is mechanically moved between its open and closed positions instead of hydraulically. Also, the heat generated during sealing is preferably removed by a series of air blasts instead of by utilizing cooling water in coil 30.

Figure 6:
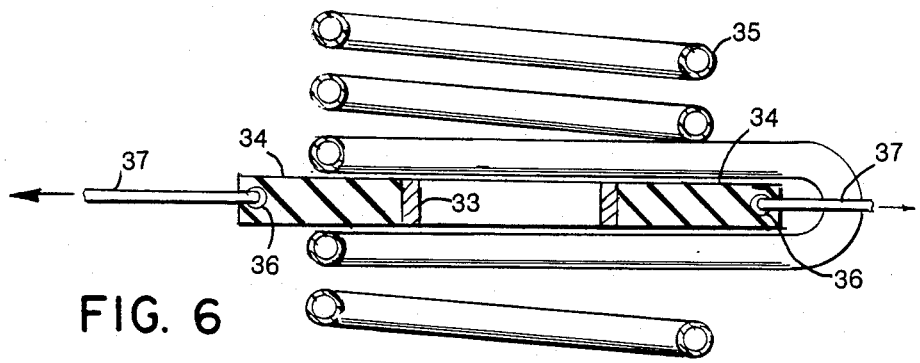
FIG. 6 is a view in section of a heat sealing apparatus illustrating a fourth embodiment of the invention.

FIG. 6 shows a heat sealing apparatus constituting a fourth embodiment of the present invention. The sealing apparatus shown in FIG. 6 includes a heating element 33, an elastic sleeve 34, and an induction heating coil 35. Heating element 33 is in the form of a seamless, tubular cylinder defining a central heat sealing zone. It should be noted, however, that the length of element 33 is substantially less than the length of elements 1, 16 and 28 previously described, and therefore the sealing zone is also substantially less. As a result, element 33 will provide a seal of less axial length for plastic members 4 and 5 than elements 1, 16 and 28. Heating element 33, however, is composed of a silicone rubber having elastic characteristics identical to those for elements 1, 16 and 28, and therefore can readily be expanded to a non-bonding position and contracted to a bonding position as previously described herein. Element 33 is also fabricated by uniformly dispersing into silicone rubber a particulate material which will generate the heat for bonding when excited by the high frequency magnetic field of induction heating coil 35.

Sleeve 34 is in the form of an annular washer, and is comprised of a non-heat generating silicone rubber having elastic characteristics substantially identical to those of heating element 33. Sleeve 29 includes several rigid, nonmetal rods 36 fabricated therein. Each rod 36 has a cord 37 attached to it which extends radially outward therefrom to be connected to any suitable device for applying a radial pulling force thereon, such as the lever or cam mechanism previously referred to herein. Thus, when the cords 37 are caused to be moved radially outward, sleeve 34 will be elastically expanded to an open or non-bonding position, and when cords 37 are moved radially inward, sleeve 34 will be allowed to contract to its closed or bonding position. Since heating element 33 is adhesively bonded onto the inner surface of sleeve 34, element 33 will also be moved between its bonding and non-bonding positions.

Coil 30 provides the means for raising the temperature of heating element 33 to heat the interface of members 4 and 5 to a bonding temperature. Coil 30 encircles both element 33 and sleeve 34, and extends at least the entire axial length of sleeve 34 and preferably substantially beyond the axial sides of sleeve 34, as seen in FIG. 6, to insure adequate energization of the susceptor particles within element 33. Coil 35 preferably consists of a continuous length of copper tubing, and is connected to a conventional induction heating generator in the usual manner. It should be noted, however, that one loop of coil 35 extends radially outward substantially further than the remaining loops of coil 35. This is necessary to provide adequate space for sleeve 34 so that it may be radially expanded to its open position to permit members 4 and 5 to be loaded prior to sealing and unloaded subsequent to sealing.

The operation of the heat sealing apparatus of FIG. 6 is identical to that previously described for the first three embodiments and need not further be described. As with the apparatus shown in FIGS. 4 and 5, heat generated during sealing is preferably removed by a series of air blasts.

Several preferred embodiments of the heat sealing apparatus of the present invention have been illustrated and described herein. The invention has been shown and practiced with an annular collapsing bladder generally as shown above, but may within the broad teaching provide an inverse sealing action when located within an annular workpiece and actuated to press outwardly. The invention has been particularly described with the use of an induction heating source. However, it will be obvious to those skilled in the art that other sources of energy may also be used for raising the temperature or the heating elements. For example, the heating elements may be adapted to respond to heat sources, such as radiant, dielectric, and conductive as well as inductive sources. Also, in addition to the silicone elastomers which are preferably used herein, other elastomers may also be used so long as they have adequate life and sufficient elastic characteristics. However, while the susceptor particles incorporated within the heating elements described herein have been particularly described in the form of discrete particles, a susceptor material can be used which is in the form of a continuous strip, wire or the like, or in the form of fibers, threads, a woven fabric or screening embedded into any suitable elastic base material. The susceptor particles of the present invention have been particularly described as being dispersed throughout the entire heating element. However, it is readily apparent that these particles could be distributed only within defined portions of the heating element. This might result in a seal that extends only partially around the plastic members, yet is still of adequate strength to bond the members together.

Various modes of carrying out the invention are contemplated as being within the scope of the following claims particularly pointing out and distinctly claiming the subject matter which is regarded as the invention.

I claim:

1. A heat sealing apparatus for providing a smooth and wrinkle-free bond between the adjoining surfaces of two plastic members to form a self-supporting assembly, the combination comprising:

a seamless, tubular elastic heating element encircling the plastic members and positioned about the surfaces to be bonded, said heating element having a bonding position in which said elastic heating element is under tension and having an elastic flexible inner surface engaging and conforming to the external configuration of the plastic members, and a non-bonding position wherein its elastic flexible inner surface is spaced from the plastic members;

said heating element includes a uniform dispersion of particulate material integrally disposed therein capable of generating heat in response to a source of energy and operable with the expansion and contraction of the element;

an induction heating means for raising the temperature of the particulate material to heat said adjoining surfaces to a bonding temperature; and hydraulic positioning means coupled to the heating element and disposed circumferentially thereabout for moving the heating element between its respective bonding and non-bonding positions whereby in said bonding position the heating element is contracted about said plastic members to establish a bonding pressure thereon and said elastic flexible inner surface totally conforms to the configuration of the plastic members, and in said non-bonding position the heating element is elastically expanded outwardly of said bonding position to permit relative movement of said plastic members with respect to the heating element.

2. The heat sealing apparatus of claim 1 wherein said hydraulic positioning means includes:

an annular inflatable bladder encircling said heating element having an elastic inner wall and a substantially rigid outer wall defining an annular pressure chamber, said heating element being attached to the working engaging surface of said inner wall, and a hydraulic cylinder operatively connected to said bladder for alternately pressurizing and evacuating said chamber to move said heating element between its respective bonding and non-bonding positions.

3. The heat sealing apparatus of claim 2 wherein the inner wall of said bladder is in the shape of an hourglass having a substantially offset central waist, and the heating element is adhesively bonded to the waist of said hourglass-shaped inner wall.

4. The heat sealing apparatus of claim 2 wherein:

said induction heating means includes an induction coil spaced from and encircling said heating element and positioned within said pressure chamber.

5. The heat sealing apparatus of claim 3 wherein:

the inner wall is thinnest at its waist so that maximum deflection of said wall occurs at said waist when the bladder is pressurized.

* * * * *